United States Patent
Dutta et al.

(10) Patent No.: US 9,923,875 B2
(45) Date of Patent: Mar. 20, 2018

(54) OPERATING METHOD FOR SHARING CONTENT IN A HOME NETWORK AND SYSTEM THEREOF

(71) Applicant: Samsung Electronics Co., Ltd., Suwon-si, Gyeonggi-do (KR)

(72) Inventors: Bhaskar Dutta, Noida (IN); Ashish Kumar Srivastava, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 14/956,624

(22) Filed: Dec. 2, 2015

(65) Prior Publication Data

US 2017/0118177 A1    Apr. 27, 2017

(30) Foreign Application Priority Data

Dec. 2, 2014  (IN) ............................ 6059/CHE/2014
Oct. 26, 2015  (KR) ........................ 10-2015-0148604

(51) Int. Cl.
*H04L 29/06*   (2006.01)
*H04L 29/08*   (2006.01)
*H04L 12/28*   (2006.01)

(52) U.S. Cl.
CPC ...... *H04L 63/0428* (2013.01); *H04L 12/2801* (2013.01); *H04L 67/1097* (2013.01)

(58) Field of Classification Search
CPC ............. H04L 63/0428; H04L 67/1097; H04L 12/2801

USPC .......................................................... 713/168
See application file for complete search history.

(56) References Cited

U.S. PATENT DOCUMENTS 7,519,681 B2    4/2009   Edwards et al.
8,613,070 B1 *  12/2013  Borzycki ............ G06F 21/6218
                                                      726/8
2010/0153591 A1  6/2010  Cho

FOREIGN PATENT DOCUMENTS

WO    2007/047233 A1    4/2007

* cited by examiner

*Primary Examiner* — Aubrey Wyszynski
(74) *Attorney, Agent, or Firm* — Jefferson IP Law, LLP

(57) ABSTRACT

A system and method for enabling access of content in a home network are provided. The method includes receiving a content on a source device. Further, the method includes setting content sharing preferences by the source device. The content sharing preferences indicate whether a device is authorized to access the content. The method includes encrypting the content on the source device. Further, the method includes storing the encrypted content in a shared storage device. The method includes receiving a request from a device for decryption of the encrypted content. Further, the method includes decrypting the content by the source device based on the content sharing preferences. Furthermore, the method includes providing the decrypted content to the device, thereby enabling access of the content to the device.

28 Claims, 14 Drawing Sheets

OPERATING METHOD FOR SHARING CONTENT IN A HOME NETWORK AND SYSTEM THEREOF

CROSS-REFERENCE TO RELATED APPLICATION(S)

This application claims the benefit under 35 U.S.C. § 119(a) of an Indian patent application filed on Dec. 2, 2014 in the Indian Intellectual Property Office and assigned Serial number 6059/CHE/2014(CS), and of a Korean patent application filed on Oct. 26, 2015 in the Korean Intellectual Property Office and assigned Serial number 10-2015-0148604, the entire disclosures of each of which is hereby incorporated by reference.

TECHNICAL FIELD

The present disclosure relates to the field of digital media sharing in a home network. More specifically, the present disclosure relates to the field of providing access to content stored in a shared storage server for devices connected in a home network.

BACKGROUND

A home network includes multiple interoperable digital devices. One example of a home network is an audio system in communication with a personal computer, allowing a user to stream and play audio content from the personal computer via the audio system. Another example of a home network is a group of kitchen appliances in communication with a hand held mobile phone to control the kitchen appliances.

In an existing home network scenario, an external storage device is connected to a smart television (TV). The external storage device behaves as a media server to multiple devices connected in the home network. A media server is an entertainment control center for cataloging, organizing, and distributing multimedia collection throughout a private network. In the existing systems, the smart TV encrypts the recorded content and stores the content in the external storage device. Each device connected to the home network can browse the contents available in the external storage device. However, the other devices in the home network apart from the Smart TV recording the content are incapable of playing the recorded content.

In the related art, digital rights management (DRM) is performed to prevent unauthorized use of streamed and recorded content in the media server. DRM prevents unauthorized redistribution of content among other devices in the home network. Often, multiple devices in the home network request access to contents in the media server. However, the method imposes a high burden on the media server since the content can be played only with the help of media server. Moreover, the related art does not indicate one of a playable and non-playable status for contents stored in the media server.

Often, instead of the media server authorizing a requesting device, it is desired to shift the burden of authorizing to a device that records the content. For example, consider a scenario where a parent has watched a movie and downloaded the movie on to the media server. The parent may desire to authorize certain members at home to watch the movie. Further, the parent may restrict certain other members from watching the movie. It is also desired that the parent be informed which member of the family is watching the movie, at any given time.

Now, consider another scenario where a member at home would like to see the content available in the media server. It is often desired in such scenarios that a list of playable and non-playable status of contents stored in the media server be displayed to the member.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system that allows devices to have control over grant of access to contents stored in the home network.

Another aspect of the present disclosure is to provide a method and system to perform encryption and authorization by any device in the home network, thereby providing content access to various devices in the home network. Further, it is desired to have a method and system to indicate the playable and non-playable status of contents stored in the media server In accordance with an aspect of the present disclosure, a method of operating a source device is provided. The method includes encrypting a content received on the source device, storing the encrypted content in a shared storage device, receiving a request from a device for decryption of the encrypted content, decrypting the encrypted content, and providing the decrypted content to device.

In accordance with another aspect of the present disclosure, a method of operating a target device is provided. The method includes accessing a content list by a target device, wherein the content list is provided by a shared storage device, requesting a content access to a device, wherein the content is an encrypted content stored in the shared storage device, and receiving decrypted content from the device by the target device.

In accordance with another aspect of the present disclosure, a method of operating a shared storage device is provided. The method includes storing an encrypted content provided by a source device in a shared storage device, providing a content list which is generated based on the encrypted content to a target device, receiving a request from the target device to decrypt the encrypted content, sending the request to the source device, receiving decrypted content from the source device, and rendering the decrypted content to the target device.

In accordance with another aspect of the present disclosure, an apparatus of a source device is provided. The apparatus comprises a communication interface and a processor operatively coupled to the communication interface. The processor is configured to encrypt a content received on the source device, set content sharing preferences based on the encrypted content, store the encrypted content in a shared storage device base on the content sharing preferences, receive a request for decryption of the encrypted content from a device, decrypt the encrypted content, and provide the decrypted content to the device.

The features and advantages described in this summary and in the following detailed description are not exhaustive, and particularly, many additional features and advantages will be apparent to one of ordinary skill in the relevant art in view of the drawings, specification, and claims hereof.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure described herein disclose a method and system for enabling access of an encrypted content to one or more devices connected in a home network. A first device, hereinafter referred to as a source device encrypts and stores a streamed content in a storage device. One or more other devices in the home network, hereinafter referred to as target device attempts to access the stored content. The present disclosure discusses the method in which access is granted to the encrypted content. The various methods and embodiments for accessing the encrypted content are explained in detail in conjunction with the description of FIGS. 1 to 9.

Figure 1:
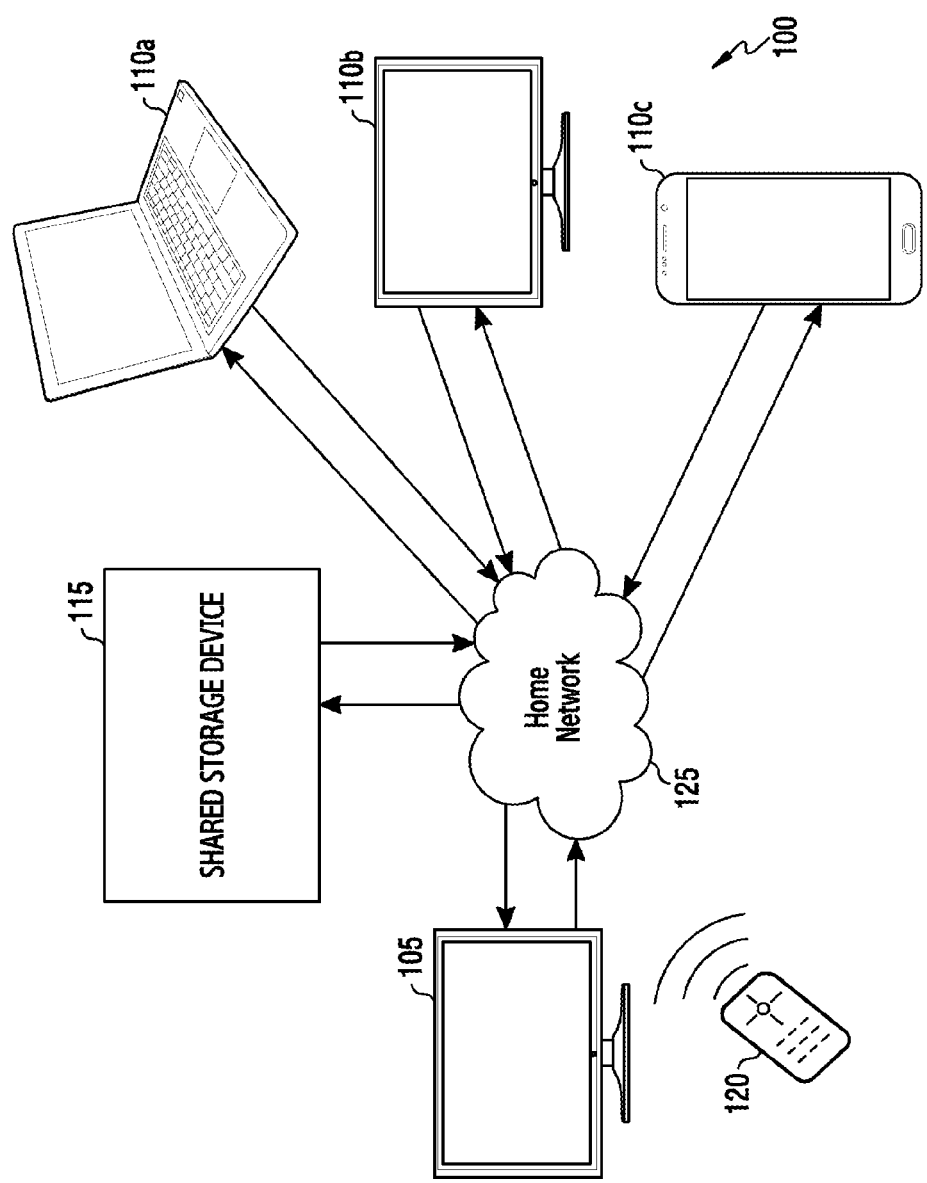
FIG. 1 is a block diagram of a network environment according to an embodiment of the present disclosure.

FIG. 1 is a block diagram of a network environment according to an embodiment of the present disclosure.

Referring to FIG. 1, a network environment 100 includes a source device 105, a plurality of target devices 110a, 110b, and 110c, a shared storage device 115, and a user input device 120. The source device 105, the plurality of target devices 110a, 110b, and 110c, and the shared storage device 115 are connected to each other via a home network 125. Although source device 105, and the target devices 110a, 110b, and 110c are illustrated for description purposes, those skilled in the art will recognize that any number of devices may be connected in the home network 125. The source device 105, and the plurality of target devices 110a, 110b, and 110c include but are not limited to a television (TV), a liquid crystal display (LCD) monitor, a smart glass, a smart TV, a personal digital assistant, a tablet, a digital versatile disc (DVD) player, a Blu-Ray player, a gaming console, a set top box, and a smart phone. The source device 105 is capable of recording content using an integrated recorder. The content comprises at least one of images, videos, documents, website content, broadcast content, games, or a combination thereof. Further, the source device 105 encrypts the content and stores the encrypted content in the shared storage device 115. The source device 105 encrypts the content using at least one of high-bandwidth digital content protection (HDCP™), document security solution (NASCA), Kruptos 2, and Widevine digital rights management (DRM). The shared storage device 115 is at least one of a digital media server (DMS), network hard disk drive (HDD), and a server capable of storing multimedia content.

One among the plurality of target devices 110a, 110b, and 110c accesses the encrypted content stored in the shared storage device 115. One among the plurality of target devices 110a, 110b, and 110c sends a content access request to the shared storage device 115 based on selection of the encrypted content. The shared storage device sends a decryption request to the source device 105. In one embodiment of the present disclosure, one among the plurality of target devices 110*a*, 110*b*, and 110*c* sends the decryption request to the source device 105. Further, the source device 105 decrypts the content, thereby enabling access of the content to one among the plurality of target devices 110*a*, 110*b*, and 110*c*. The user input device 120 enables a user to perform operations including but not limited to encryption, storage, setting preferences, authorization, and decryption. The user input device 120 is at least one of a remote control, a touch pad, a gesture voice, touch ball, attentive user interfaces, text based interfaces, and an electronic mouse. The source device 105 and the plurality of target devices 110*a*, 110*b*, and 110*c* establish a connection with the shared storage device 115. In one embodiment of the present disclosure, the shared storage device 115 is a software framework that provides execution of procedures for supporting its applied applications. In another embodiment of the present disclosure, the shared storage server 115 is a physical server.

Figure 2:
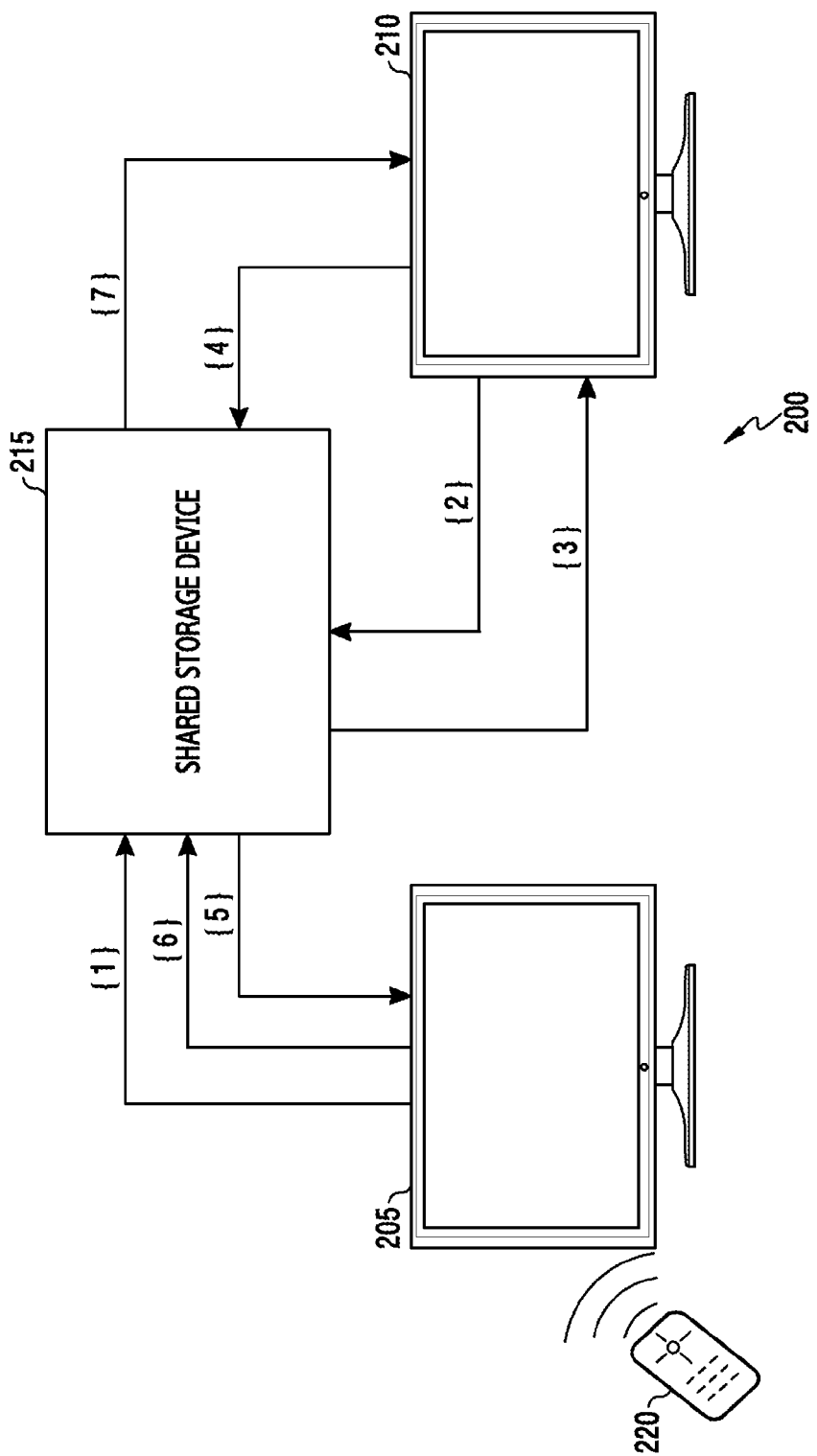
FIG. 2 illustrates a system for enabling access of content stored in a shared storage device by a target device according to an embodiment of the present disclosure.

FIG. 2 illustrates a system for enabling access of content stored in a shared storage device by a target device, according to an embodiment of the present disclosure.

Referring to FIG. 2, a system 200 includes a source device 205, a target device 210, a shared storage device 215, and a user input device 220. The source device 205 can be any device in the home network. The source device 205 performs encryption and authorization of content. The target device 210 can be any device in the home network accessing the encrypted content from the shared storage device 215. The source device 205 and the target device 210 include but are not limited to a TV, an LCD monitor, a smart glass, a smart TV, a personal digital assistant, a tablet, a DVD player, a Blu-Ray player, a gaming console, a set top box, and a smart phone. The source device 205 encrypts the content and stores the encrypted content in the shared storage device 215. The shared storage device 215 is at least one of a DMS, network HDD, and a server capable of storing multimedia content.

The system 200 enables the target device 210 to access content from the shared storage device 215. The execution of the operations for rendering the content from the shared storage device 215 to the target device 210 are as follows:

The source device 205 encrypts the content and stores the encrypted content in the shared storage device 215, depicted as operation 1 in FIG. 2.

The target device 210 browses the content stored in the shared storage device 215, depicted as operation 2 in FIG. 2.

The shared storage device 215 provides a content list to the target device 205, depicted as operation 3 in FIG. 2.

The target device 210 forwards a content access request to the shared storage device 215 based on user selection of encrypted content, depicted as operation 4 in FIG. 2.

The shared storage device 215 sends the encrypted content for decryption to the source device 205, depicted as operation 5 in FIG. 2.

The source device 205 transfers the decrypted content to the shared storage device 215, depicted as operation 6 in FIG. 2.

The shared storage device 215 streams the decrypted content to the target device 210, depicted as operation 7 in FIG. 2.

The source device 205 stores content sharing preferences along with the encrypted content in the shared storage device 215. In one embodiment of the present disclosure, the source device 205 stores the content sharing preferences in a memory available in the source device 205. The content sharing preferences define the list of target devices allowed to access the contents. Further, the content sharing preferences can be used to define which target devices are restricted from accessing the contents. It is to be noted that the source device 205 can modify the content sharing preferences in real time. Consider, for example, a new device has registered in the home network. The source device 205 does not have the content sharing preferences of the new device. In such a scenario, the source device 205 modifies the content sharing preferences to either allow or restrict the new device from accessing the content. In one embodiment of the present disclosure, the source device 205 is notified with the information of the devices that are currently viewing the content stored by the source device 205.

Figure 5A:
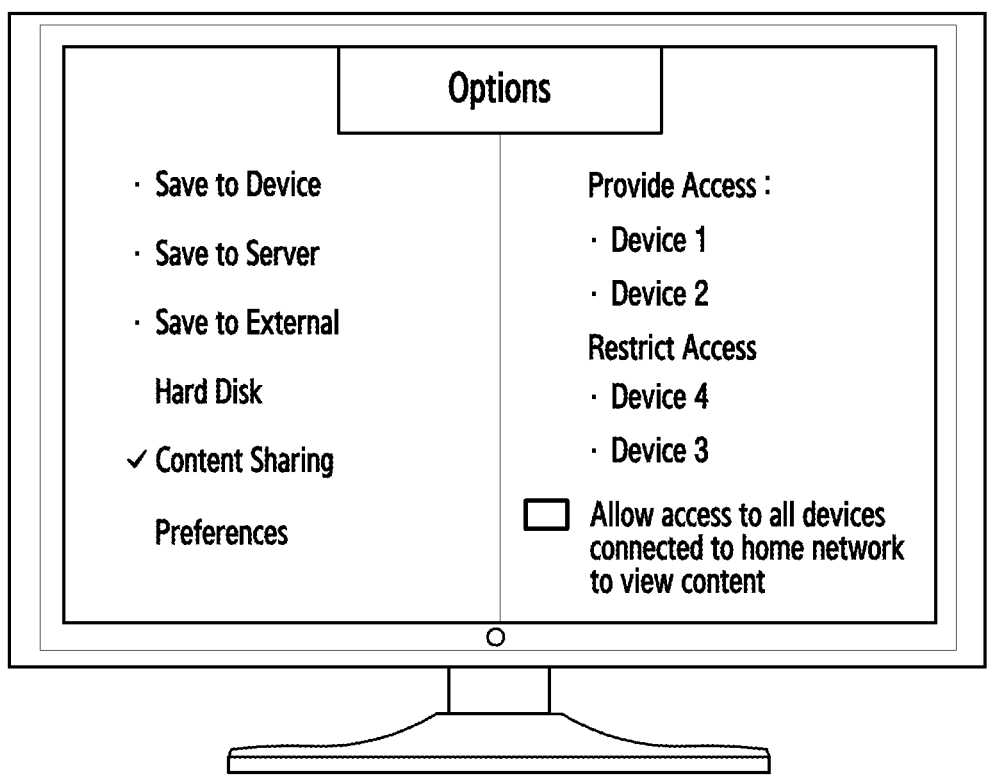
FIG. 5A illustrates a source device setting content sharing preferences for an encrypted content according to an embodiment of the present disclosure.

The arrangement of the content sharing preferences displayed in the source device 205 is further illustrated in FIG. 5A.

The target device 210 requests a content access to one of the source device 205 and the shared storage device 215. In one embodiment of the present disclosure, the target device 210 requests the content access to the shared storage device 215. Further, the shared storage device 215 provides the content after authorization by the source device 205.

The shared storage device 215 retrieves the source device identification (ID) and source device name from the content list. The shared storage device 215 checks the content sharing preference of the encrypted content selected by the target device 210. Further, the shared storage device 215 retrieves the network information of the source device 205 from the content list. Further, the shared storage device 215 forwards the request for content access to the source device 205.

The source device 205 decrypts the encrypted content. The decrypted content is sent to the shared storage device 215. The communication between the source device 205, the target device 210 and the shared storage device 215 is done via communication protocols including, but not limited to wireless fidelity (WiFi), WiFi-Direct, ZigBee®, near field communication (NFC), Bluetooth® (BT), digital living network alliance (DLNA), Mira cast, and high definition link (HDL).

The shared storage device 215 receives the decrypted content from the source device 205. Further, the shared storage device 215 provides the decrypted content to the target device 210. The decrypted content rendered to the target device 210 can include video, audio, images, and documents.

Figure 3:
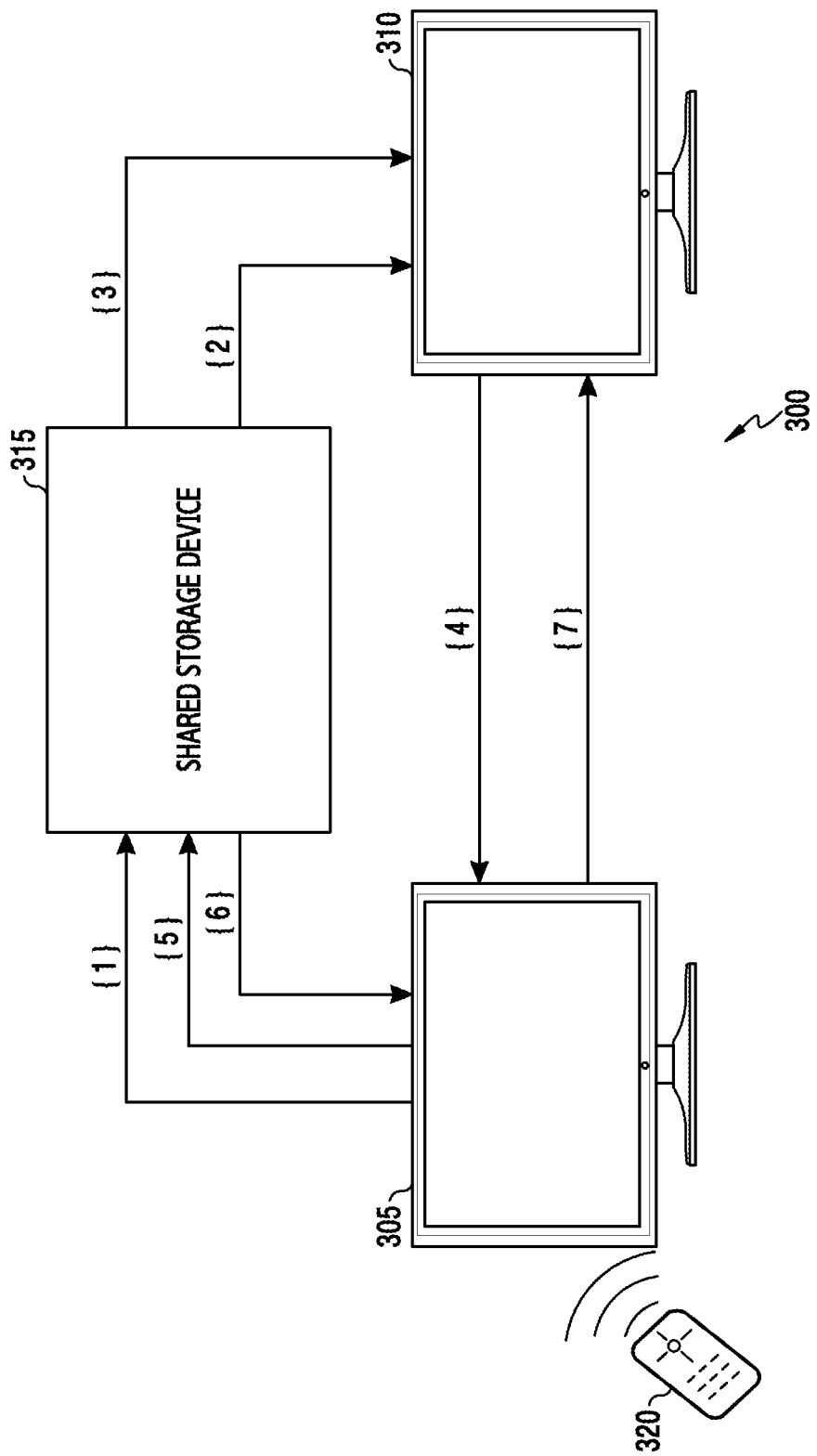
FIG. 3 illustrates a system for enabling access of content stored in a shared storage device by a target device according to another embodiment of the present disclosure.

FIG. 3 illustrates a system for enabling access of content stored in a shared storage device by a target device according to an embodiment of the present disclosure.

Referring to FIG. 3, a system 300 includes a source device 305, a target device 310, a shared storage device 315, and a user input device 320. It is to be noted that though FIG. 2 and FIG. 3 have similar operations, in FIG. 3 a target device sends a content access request to a source device directly. The execution of the operations for enabling the source device 305 to render the decrypted content to the target device 310 are as follows:

The source device 305 encrypts the content and stores the encrypted content in the shared storage device 315, depicted as operation 1 in FIG. 3.

The target device 310 browses the content stored in the shared storage device 315, depicted as operation 2 in FIG. 3.

The shared storage device 315 provides a content list to the target device 305, depicted as operation 3 in FIG. 3.

The target device 315 sends a content access request to the source device 305, depicted as operation 4 in FIG. 3.

The source device 305 requests the shared storage device 315 for the encrypted content selected by the target device 310, depicted as operation 5 in FIG. 3.

The shared storage device 315 sends the encrypted content for decryption to the source device 305, depicted as operation 6 in FIG. 3.

Source device 305 streams the decrypted content to the target device 310, depicted as operation 7 in FIG. 3.

The target device 310 accesses the content in the shared storage device 315. The shared storage device 315 provides a content list to the target device 310. The content list includes metadata of the content. The target device 310 identifies the source device 305 based on network information provided in the content list. The target device 310 requests the content access to the source device 305. Further, the source device 305 parses the content sharing preferences stored in a memory of the source device 305. The source device 305 decides on at least one of providing content access to the target device 310 and restricting content access to the target device 310 based on the content sharing preferences.

The source device 305 sends a request to the shared storage device 315 for the encrypted content. The shared storage device 315 sends the encrypted content to the source device 305 for decryption.

The source device 305 decrypts the encrypted content. Further, the source device 305 renders the decrypted content to the target device 310.

Figure 4:
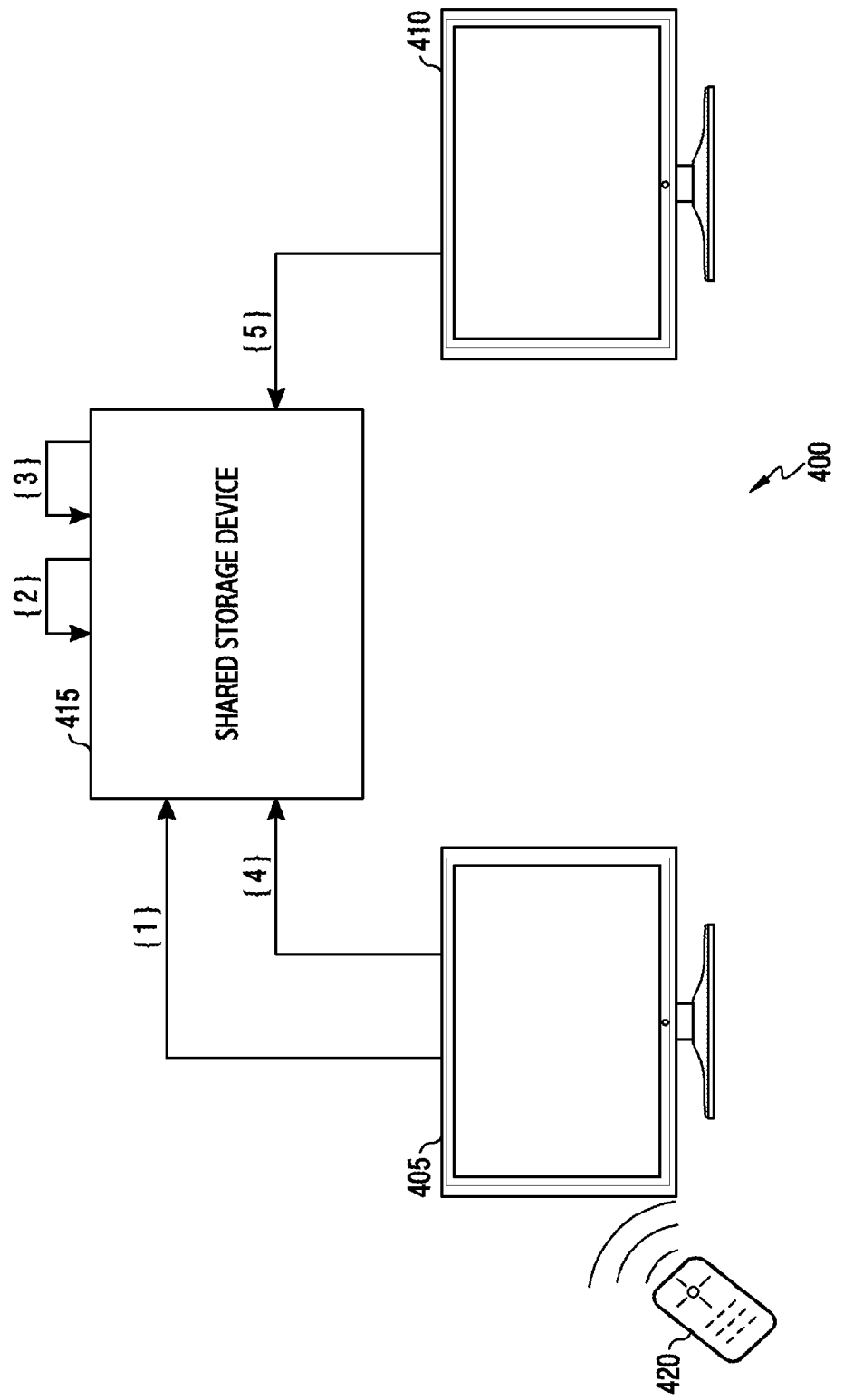
FIG. 4 illustrates a system for updating a content list for enabling access of content to a target device in a home network according to an embodiment of the present disclosure.

FIG. 4 illustrates a system for updating a content list for enabling access of content to a target device in a home network according to an embodiment of the present disclosure.

Referring to FIG. 4, a system 400 includes a source device 405, a target device 410, a shared storage device 415, and a user input device 420. The source device 405 encrypts the content and stores the encrypted content in the shared storage device 415.

The target device 410 requests content to the shared storage device 415. The shared storage device 415 provides a content list to the target device 410. The target device 410 browses through the content list. The content list is modified by the shared storage device 415 as per the content sharing preferences set by the source device 405.

The execution of the operations for updating the content list in the shared storage device 415 are as follows:

Source device 405 encrypts the content and stores the encrypted content in the shared storage device 415, depicted as operation 1 in FIG. 4.

The shared storage device 415 creates a content list, depicted as operation 2 in FIG. 4.

The shared storage device 415 monitors the connectivity status of the source device 405 in the home network, depicted as operation 3 in FIG. 4.

The shared storage device 415 updates the playable-non playable status of the encrypted content in the content list, depicted as operation 4 in FIG. 4.

Target device 410 accesses a content in the shared storage device 415, depicted as operation 5 in FIG. 4.

The shared storage device 415 creates the content list for the encrypted content stored in the shared storage device 415. The content list includes metadata of the content including content name and date of creation, source device name, network information, name of user that stored the content in the shared storage device 415, and a playable-non playable status of the stored content. The content of the network information includes an internet protocol (IP) address and a media access control (MAC) address of the source device 405. The playable-non playable status indicates one of source device power status, connection status of the source device in the home network, and source device sharing preferences. The sharing preference indicates if the target device 415 is allowed to view the content. The content list is modified by the shared storage device 415 as per the content sharing preferences set by the source device 405.

The shared storage device 415 continuously monitors the home network. During monitoring, the shared storage device 415 scans the connectivity status of the source device 405. Based on the monitoring, the shared storage device 415 updates the content list on a regular basis. In case the source device 405 is connected to the home network, a playable status is indicated in the content list. In case the source device 405 is disconnected from the home network, a non-playable status is indicated in the content list. In one embodiment of the present disclosure, the shared storage device 415 monitors the home network for detection of an event on the home network. The event detected by the shared storage device 415 is at least one of the target device 410 accessing the shared storage device 415, the source device 405 editing the content sharing preferences, and an unregistered device connecting to the home network.

FIG. 5A illustrates a source device setting content sharing preferences for an encrypted content according to an embodiment of the present disclosure.

Referring to FIG. 5A, a source device is provided with options to save the encrypted content in one of source device, server, and storage device. Further, the source device stores content sharing preferences along with the encrypted content in a shared storage device. In one embodiment of the present disclosure, the source device stores the content sharing preferences in the source device. For example, the source device provides content access to a device 1, and device 2. Further, the source device restricts content access to device 3, and device 4. Further, the source device can override all previous settings by allowing access to all devices connected in a home network. The overriding is defined as the device can either passing over previous status or modifying the previous status by new instructions.

Figure 5B:
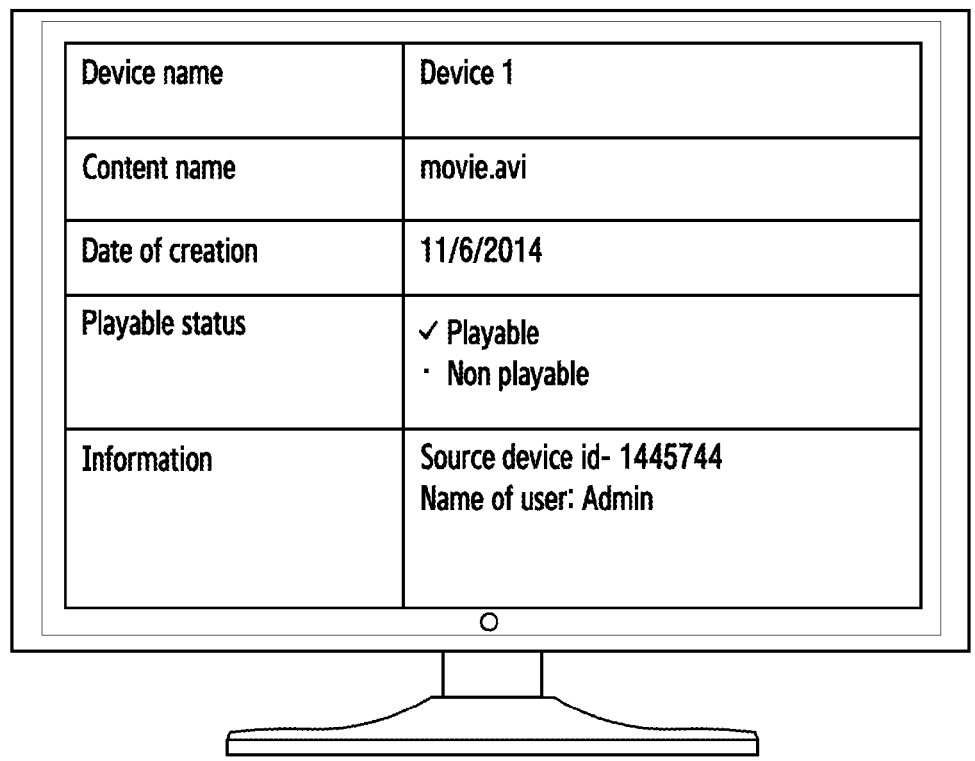
FIG. 5B illustrates a target device accessing a content list in a shared storage device according to an embodiment of the present disclosure.

FIG. 5B illustrates a target device accessing a content list in a shared storage device according to an embodiment of the present disclosure.

Referring to FIG. 5B, a content list is generated by a shared storage device based on information retrieved from the source device. For example, the content list comprises information related to the content "movie.avi" stored by the source device "device 1". Further, the name of the user that stored the encrypted content in the shared storage device is provided. In a scenario where the "device 1" is connected to the home network, the playable status is checked. The status "playable" indicates that the "content access request can be forwarded to the source device "device 1".

Figure 5C:
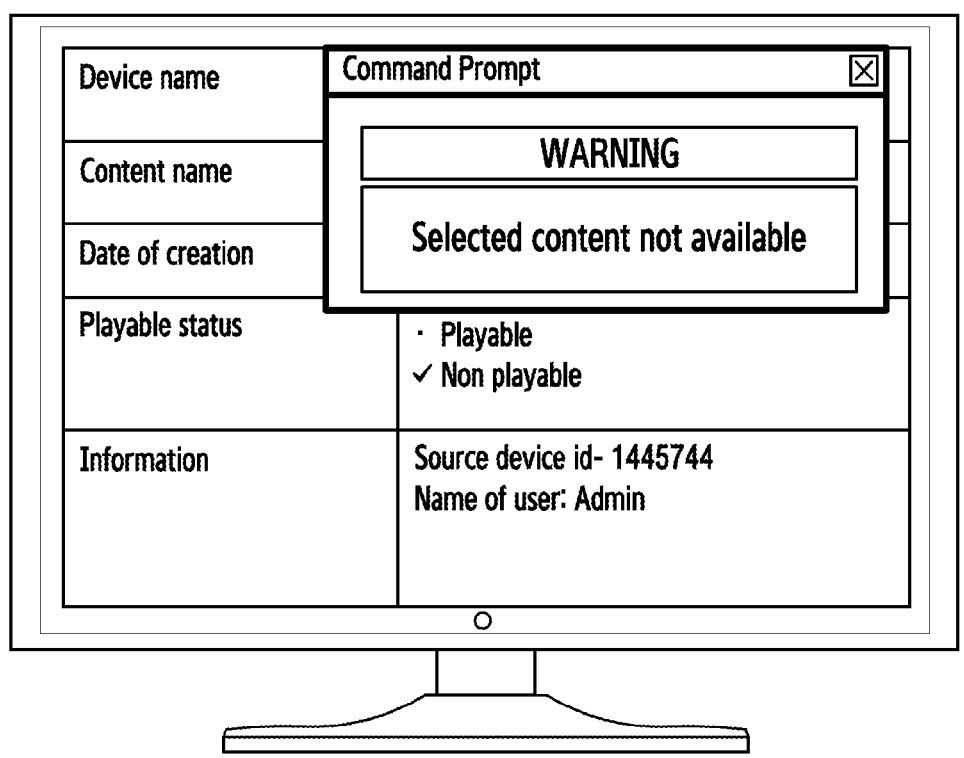
FIG. 5C illustrates a command prompt displayed in a target device according to an embodiment of the present disclosure.

FIG. 5C illustrates a command prompt displayed in a target device according to an embodiment of the present disclosure.

Referring to FIG. 5C, when the target device requests for a specific content in the shared storage device, a command prompt is displayed on the target device. The command prompt notifies the target device of the restricted access to the selected content. The reasons for the restricted access of selected content include one of disconnection of the source device from the home network, limited accessibility defined for the target device, run time rejection of access request by the source device, and deletion of selected content from the shared storage device.

Figure 6:
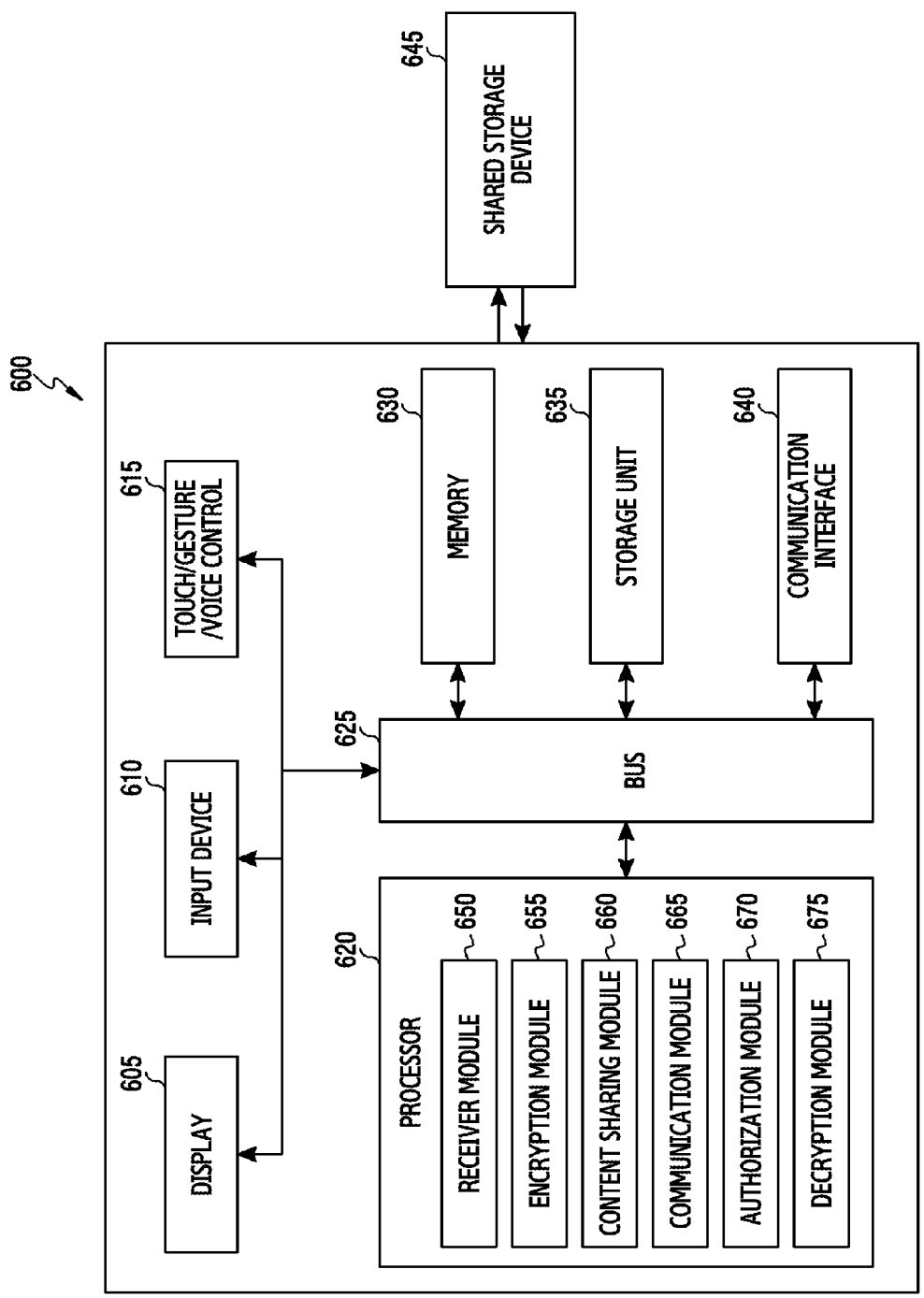
FIG. 6 is a block diagram of a device for enabling access of the content in a home network, according to an embodiment of the present disclosure.

FIG. 6 is a block diagram of a device for enabling access of content in a home network, according to an embodiment of the present disclosure.

Referring to FIG. 6, the device 600 includes one of a source device and a target device. The device 600 includes at least one of a bus 625 and other communication mechanisms for communicating information. The device 600 includes a processor 620 coupled with the bus 625. The processor 620 can include an integrated electronic circuit for processing and controlling functions of the device 600. The processor 620 includes a receiver module 650, an encryption module 655, a content sharing module 660, a communication module 665, an authorization module 670, and a decryption module 675 for processing content in the device 600. The receiver module 650 receives content in the device 600. The content includes at least one of images, videos, documents, website content, broadcast content, games, or a combination of aforementioned content types. The encryption module 655 encrypts the content received by the receiver module 650. The content sharing module 660 shares the encrypted content with a shared storage device 645. Further, the content sharing module 645 shares a content list and content sharing preferences along with the encrypted content. The encrypted content is shared with the shared storage device 645 using the communication module 665. The communication module 665 performs at least one of transmitting an access request, transferring the encrypted content to the shared storage device 645, receiving the encrypted content from the shared storage device 645, and transferring the decrypted content to the shared storage device 645. The authorization module 670 enables access to the encrypted content. The decryption module 675 performs decryption of the encrypted content.

Further, the device 600 includes a memory 630, such as a random access memory (RAM) or other dynamic storage device, coupled to the bus 625 for storing information to be used by the processor 620. The memory 630 can be used for storing any temporary information required. A storage unit 635, such as a magnetic disk or optical disk, is provided and coupled to the bus 625 for storing information.

Various embodiments of the present disclosure are related to the use of the device 600 for implementing the techniques described herein. In one embodiment of the present disclosure, the techniques are performed by the processor 620 using information included in the memory 630. The information can be read into the memory 630 from another machine-readable medium, such as the storage unit 635. The instructions are stored in the memory 630.

The term "machine-readable medium" as used herein refers to a medium that participates in providing data that causes a machine to operate in a specific fashion. In an embodiment implemented using the device 600, various machine-readable medium are involved, for example, in providing information to the processor 620. The machine-readable medium can be a storage media. Storage media includes both non-volatile media and volatile media. Non-volatile media includes, for example, optical or magnetic disks, such as the storage unit 635. Volatile media includes dynamic memory, such as the memory 630. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a compact disc read only memory (CD-ROM), any other optical medium, punch cards, paper tape, any other physical medium with patterns of holes, a RAM, a programmable ROM (PROM), an electrically programmable ROM (EPROM), a flash memory, any other memory chip or cartridge. In another embodiment of the present disclosure, the machine-readable medium can be transmitted as transmission media using coaxial cables, copper wire and fiber optics, including the wires that include the bus 625. Transmission media can also take the form of acoustic or light waves, such as those generated during radio-wave and infra-red data communications. The device 600 also includes a communication interface 640 coupled to the bus 625. The communication interface 640 provides a two-way data communication and coupling to the shared storage device 645.

The device 600 is coupled via the bus 625 to a display 605, such as a cathode ray tube (CRT), an LCD and a light emitting diode (LED) display, for displaying information. An input device 610, including alphanumeric and other keys, is coupled to the bus 625 for receiving an input from a user. Another type of user input device is a Touch, Gesture, or Voice control 615, such as a swipe, pattern, remote control device, a touch pad, a gesture, voice, touch ball, attentive user interfaces, text based interfaces, and a mouse and cursor direction keys for communicating the input to the processor 620 and for controlling cursor movement on the display 605. The input device 610 can also be included in the display 605, for example a touch screen.

Figure 7:
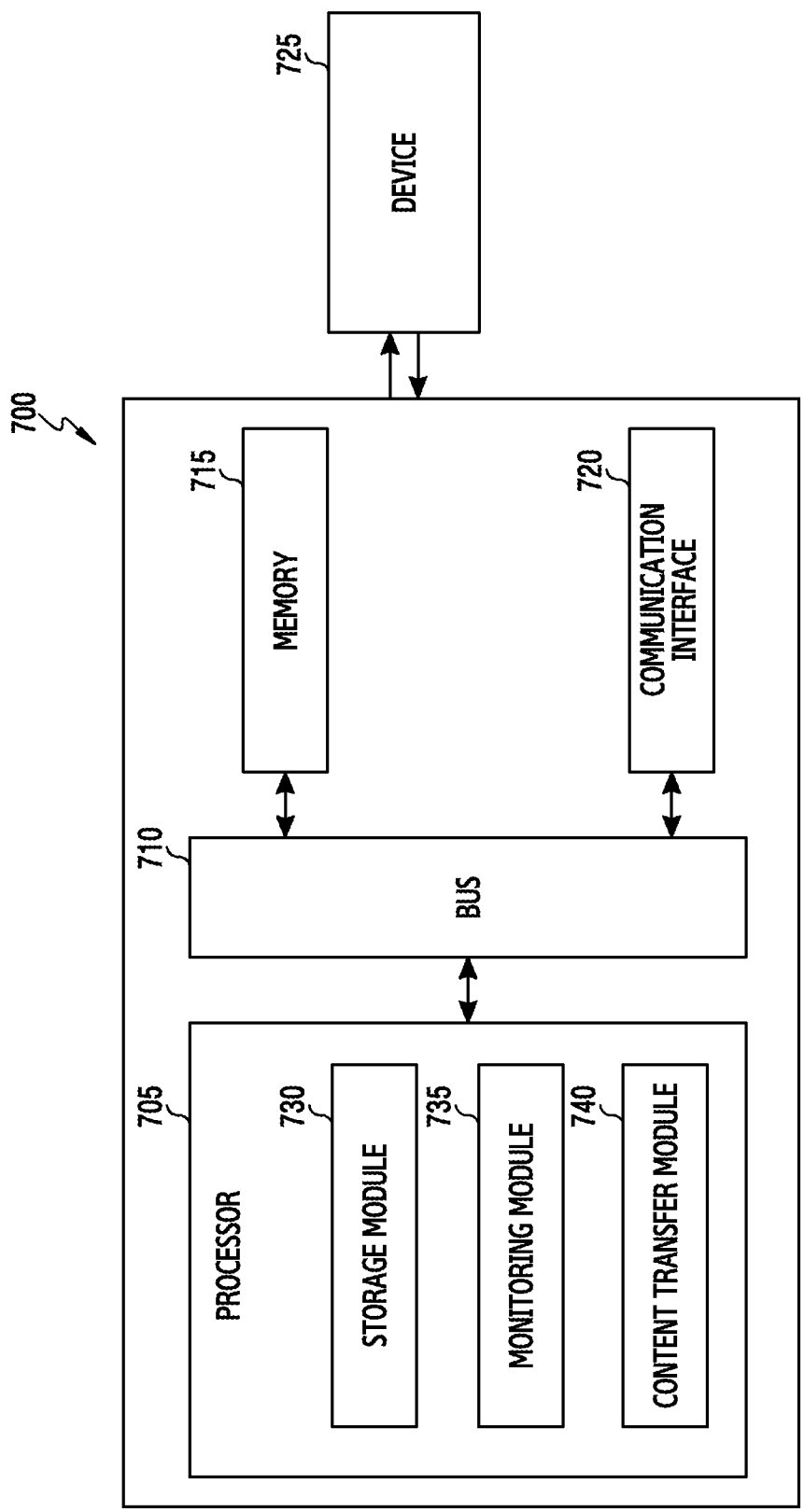
FIG. 7 is a block diagram of a shared storage device for storing encrypted content in a home network, according to an embodiment of the present disclosure.

FIG. 7 is a block diagram of a shared storage device for storing encrypted content in a home network, according to an embodiment of the present disclosure.

Referring to FIG. 7, a shared storage device 700 includes at least one of a bus 710 and other communication mechanisms for communicating information. The device 725 can be implemented as one of a source device and a target device. The shared storage device 700 includes a processor 705 coupled with the bus 710. The processor 705 can include an integrated electronic circuit for processing and controlling functionalities of the shared storage device 700. The processor 705 includes a storage module 730, a monitoring module 735, and a content transfer module 740 for processing an encrypted content in the shared storage device 700. The storage module 730 stores the encrypted content in the shared storage device 700. The encrypted content includes at least one of images, videos, documents, website content, broadcast content, games, or a combination of aforementioned content types. A content list and content sharing preferences are stored in the storage module 730 along with the encrypted content. Further, the storage module 730 receives the encrypted content from the device 725 in the home network. The monitoring module 735 detects the connectivity status of the device 725 in the home network. The content transfer module 740 transfers at least one of the encrypted content and decrypted content to the device 725. The content transfer module 740 performs at least one of transmitting a content list, transferring encrypted content to the device 725, receiving encrypted content from the device 725, and transferring decrypted content to the device 725.

Further, the shared storage device 700 includes a memory 715, such as a RAM or other dynamic storage shared storage device, coupled to the bus 700 for storing information to be used by the processor 705. The memory 715 can be used for storing any information required.

Various embodiments of the present disclosure are related to the use of the shared storage device 700 for implementing the techniques described herein. In one embodiment of the present disclosure, the techniques are performed by the processor 705 using information included in the memory 715. The information can be read into the memory 715 from another machine-readable medium, such as a storage unit. The instructions are stored in the memory 715.

The shared storage device 700 also includes a communication interface 720 coupled to the bus 710. The communication interface 720 provides data communication and coupling to the device 725.

Figure 8:
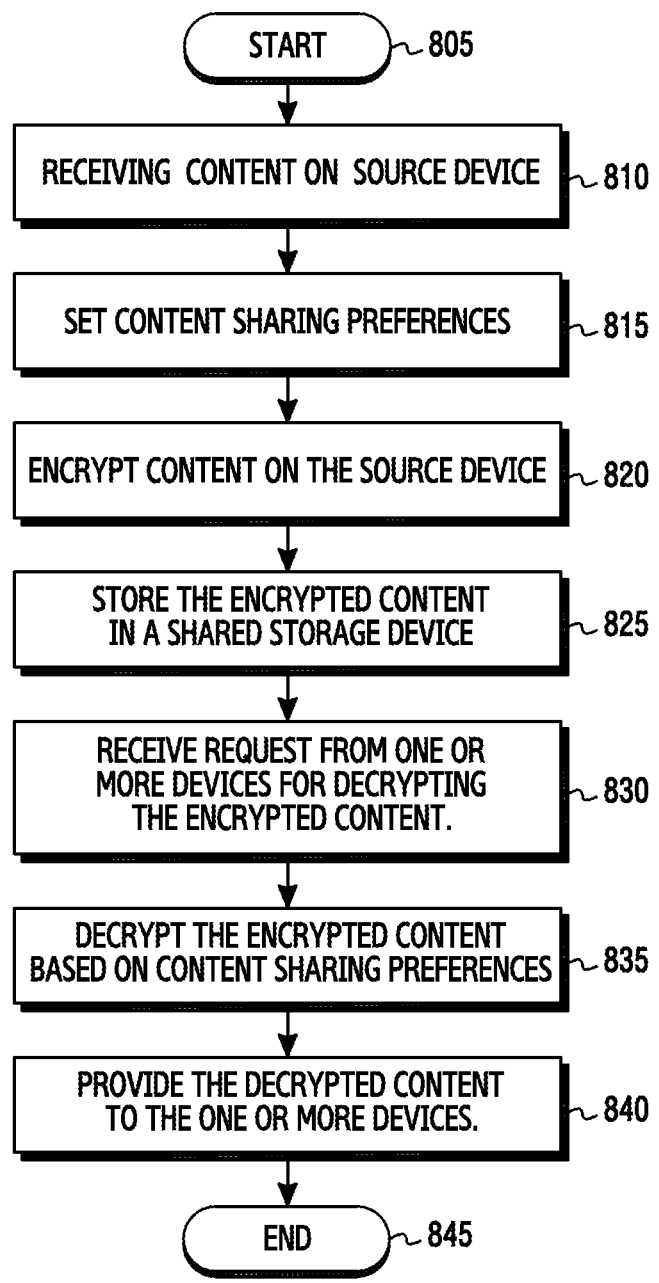
FIG. 8 is a flowchart for enabling access of the content in a home network according to an embodiment of the present disclosure.

FIG. 8 is a flowchart for enabling access of content in a home network according to an embodiment of the present disclosure.

Referring to FIG. 8, the method begins at operation 805. At operation 810, the source device receives content. The source device is at least one of a TV, an LCD monitor, a smart glass, a smart TV, a personal digital assistant, a tablet, a DVD player, a Blu-Ray player, a gaming console, a set top box, and a smart phone. The source device is capable of recording content using an integrated recorder. The content is at least one of images, videos, documents, website content, broadcast content, games, and a combination thereof.

At operation 815, the source device sets content sharing preferences for the content. The content sharing preferences include at least one of allowing access to a target device connected to the home network, and restricting access to the target device connected to the home network. Moreover, the source device is provided with an option for modifying the content sharing preferences in real time.

At operation 820, the source device encrypts the content. The source device encrypts the content using at least one of HDCP™, NASCA, Kruptos 2, and Widevine DRM.

At operation 825, the source device stores the encrypted content in a shared storage device. Further, the source device stores the content sharing preferences along with the encrypted content in the shared storage device. The shared storage device is at least one of a DMS, network HDD, and a server capable of storing multimedia content. In one embodiment of the present disclosure, the source device stores the content sharing preferences in a memory of the source device.

At operation 830, the source device receives a request for decrypting the encrypted content from one or more devices. The one or more devices include at least one of the shared storage device and a target device. The target device include but are not limited to a TV, an LCD monitor, a smart glass, a smart TV, a personal digital assistant, a tablet, a DVD player, a Blu-Ray player, a gaming console, a set top box, and a smart phone.

At operation 835, the source device decrypts the encrypted content based on the content sharing preferences.

At operation 840, the source device provides the decrypted content to the one or more devices. In one embodiment of the present disclosure, the source device provides the decrypted content to the shared storage device. Further, the shared storage device renders the decrypted content to the target device. In another embodiment of the present disclosure, the source device directly renders the decrypted content to the target device. The flowchart ends at operation 845.

Figure 9:
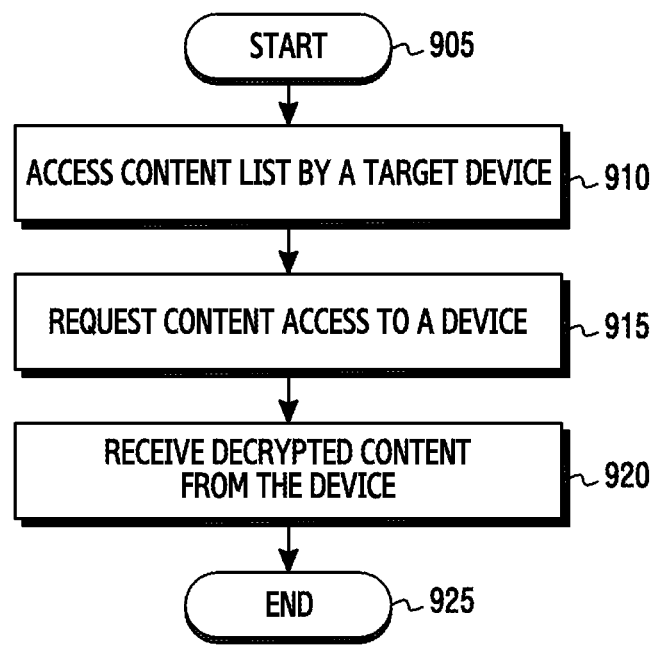
FIG. 9 is a flowchart for viewing content in a home network by a target device according to an embodiment of the present disclosure.

FIG. 9 is a flowchart for viewing content in a home network by a target device according to an embodiment of the present disclosure.

Referring to FIG. 9, the flowchart begins at operation 905. At operation 910, the target device requests content from a shared storage device. The shared storage device provides the target device with a content list. The content list comprises at least one of metadata of the content including content name and date of creation, source device ID, source device name, name of user storing the content in the shared storage device, network information and a playable-non playable status of the stored content. The network information includes an IP address of the source device and a MAC address of the source device. The playable-non playable status is based on information retrieved from the source device. The information retrieved is one of user interest to allow decryption for a particular target device, device on/off stage, resource availability for decryption, and network connectivity details.

At operation 915, the target device requests a content access to one of the source device and the shared storage device. In one embodiment of the present disclosure, the target device requests the content access to the shared storage device. Further, the shared storage device requests the source device for decryption of an encrypted content. The shared storage device receives the decrypted content from the source device. In another embodiment of the present disclosure, the target device requests the source device for decryption of the encrypted content.

At operation 920, the target device receives the decrypted content from the source device. The source device is one of the shared storage device and the source device. In one embodiment of the present disclosure, the target device receives the decrypted content directly from the shared storage device. In another embodiment of the present disclosure the target device receives the decrypted content directly from the source device. The flowchart ends at operation 925.

Figure 10:
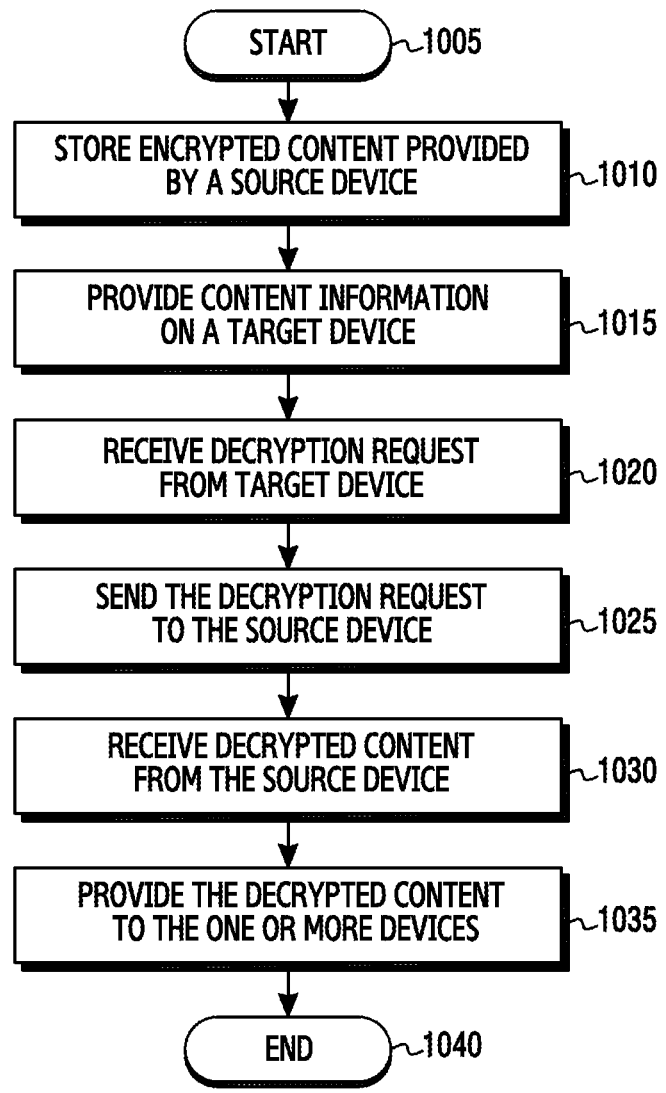
FIG. 10 is a flowchart for sharing content in a home network by a shared storage device according to an embodiment of the present disclosure.

FIG. 10 is a flowchart for sharing content in a home network by a shared storage device according to an embodiment of the present disclosure.

Referring to FIG. 10, the flowchart begins at operation 1005. At operation 1010, the shared storage device stores encrypted content provided by a source device. The shared storage device stores content sharing preferences along with encrypted content. The shared storage device is at least one of a DMS, network HDD, and a server capable of storing multimedia content.

At operation 1015, the shared storage device provides content list to a target device. The content list comprises at least one of metadata of the content including content name and date of creation, source device ID, source device name, name of user that stored the content in the shared storage device, network information and a playable-non playable status of the stored content. The network information includes an IP address of the source device and a MAC address of the source device. The playable-non playable status is based on information retrieved from the source device, the information being one of user interest to allow decryption for a particular target device, device on/off stage, resource availability for decryption, and network connectivity details.

At operation 1020, the shared storage device receives a decryption request from the target device. The communication between the target device and the shared storage device is done via communication protocols including WiFi, WiFi-Direct, ZigBee®, NFC, BT, DLNA, Mira cast, and HDL.

At operation 1025, the shared storage device sends a decryption request to the source device. The shared storage device checks the content sharing preferences prior to sending the decryption request. The source device decrypts the encrypted content on receiving the decryption request.

At operation 1030, the shared storage device receives decrypted content from the source device.

At operation 1035, the shared storage device streams the decrypted content to the target device. The rendering of the decrypted content to the target device comprises at least one of playing a video, playing audio, viewing images, and viewing documents. The flow chart ends at operation 1040.

Figure 11:
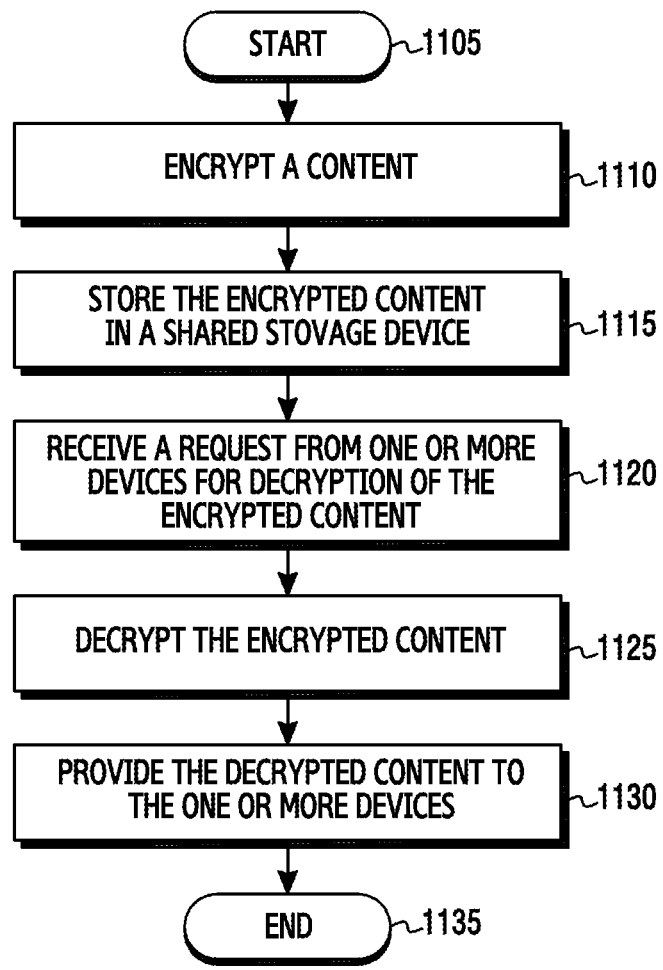
FIG. 11 is a flowchart for enabling access of content by a source device in a home network according to an embodiment of the present disclosure.

FIG. 11 is a flowchart for enabling access of content by a source device in a home network according to an embodiment of the present disclosure.

Referring to FIG. 11, the flowchart begins at operation 1105. At operation 1110, the source device encrypts a content received on the source device. At operation 1115, the source device stores the encrypted content in a shared storage device. At operation 1120, the source device receives a request from one or more devices for decryption of the encrypted content. At operation 1125, the source device decrypts the encrypted content.

At operation 1130, the source device provides the decrypted content to the one or more devices. The flow chart ends at operation 1135.

Figure 12:
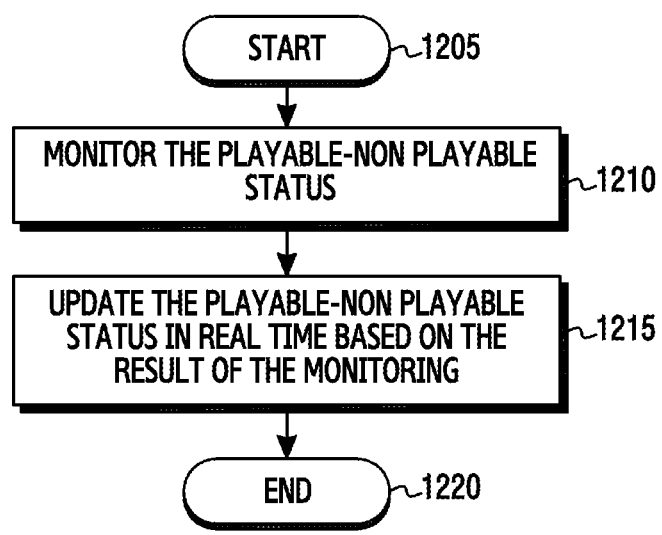
FIG. 12 is a flowchart for updating playable status of content by a shared storage device in a home network according to various embodiments of the present disclosure.

FIG. 12 is a flowchart for updating playable status of content by a shared storage device in a home network according to various embodiments of the present disclosure.

Referring to FIG. 12, the flowchart begins at operation 1205. At operation 1210, the shared storage device monitors the playable-non playable status. At operation 1215, the shared storage device updates the playable-non playable status in real time based on the result of the monitoring. The flow chart ends at operation 1220.

In one embodiment of the present disclosure, a home network refers to any private network, including but not limited to a private network controlled by an individual, a family, a business, and a public entity.

In another embodiment, the source device receives a notification each time a target device accesses the content. Further, the source device decides on at least one of providing access to the target device and declining access to the target device.

In yet another embodiment of the present disclosure, the source device receives a notification from a target device that has been allowed access according to a predefined content sharing preferences list. However, the source device may alter and deny access to the content.

In yet another embodiment of the present disclosure, a content list is transferred to a target device. The content list contains information regarding the content in at least one of a rich site summary (RSS) format, an extensible markup language (XML) format, a hyper text markup language (HTML) format, a text format, a portable document format (PDF), a word format and excel format.

In yet another embodiment of the present disclosure, a playable-non playable status of a content is depicted in the form of colored radio buttons. For example, if the radio button is green colored, the content is deemed playable. However, if the radio button is red colored, the content is deemed non playable.

In yet another embodiment of the present disclosure, content sharing preferences are stored in a memory of a source device. A shared storage device requests the source device to provide content access to a target device. The source device parses the content sharing preferences stored in the memory of the source device. The source device decides on at least one of providing content access to the target device and restricting content access to the target device.

Advantageously, the various embodiments of the present disclosure specified in the present disclosure provide a content access to one or more devices connected in a home network. The present disclosure allows a source device to stream encrypted content to at least one of a shared storage device and a target device, thereby enabling a plurality of target devices to browse and view encrypted content stored by the source device. Further, the playable-non playable status of the encrypted content is also specified. The control of which device to allow access and which device to restrict access resides with the source device, thereby increasing security in home networks.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a source device in a home network, the method comprising:
    encrypting, by the source device, a content received from a media server;
    storing the encrypted content and a list of the encrypted content on a shared storage device in the home network;
    receiving, from the shared storage device, an inquiry whether to allow decryption of the encrypted content upon request from at least one device in the home network;
    determining whether to allow decryption of the encrypted content based on a content sharing preference regarding the encrypted content; and
    responding to the inquiry of the shared storage device depending on the determination,
    wherein the content sharing preference is generated by the source device in response to a user input.

2. The method of claim 1, wherein the content sharing preference comprises at least one of allowing access to the at least one device, and restricting access to the at least one device.

3. The method of claim 2, further comprising:
    modifying the content sharing preference in real time in response to another user input.

4. The method of claim 1, further comprising receiving information, from the shared storage device, notifying whether the encrypted content has been provided to the at least one device.

5. The method of claim 1, further comprising sending a playable status to the shared storage device,
    wherein the playable status includes at least one of a power status of the source device and connection status of the source device to the home network.

6. A method of operating a shared storage device in a home network, the method comprising:
    storing an encrypted content provided by a source device in the home network;
    providing content list including the encrypted content to a target device in the home network;
    receiving a request from the target device to decrypt the encrypted content;
    sending, to the source device, an inquiry whether to allow decryption of the encrypted content upon receiving request from the target device;
    receiving a response to the inquiry determined based on a content sharing preference from the source device; and
    selectively decrypting the encrypted content depending on the response from the source device to provide the decrypted content to the target device, wherein the content sharing preference is generated by the source device in response to a user input.

7. The method of claim 6, wherein the content sharing preferences comprises at least one of allowing access to the target device, and restricting access to the target device.

8. The method of claim 7, further comprising:
modifying the content sharing preferences in real time in response to another user input.

9. The method of claim 6, wherein the content sharing preferences is stored on at least one of the source device and the shared storage device.

10. The method of claim 6, wherein the content list comprises metadata of the content including at least one of content name, time and date of creation, file format, file size, source device name, network information of the source device, name of user that stored the content in the shared storage device, and a playable status of the stored content.

11. The method of claim 10, wherein the playable status indicates one of a power status of the source device, a connection status of the source device, and the content sharing preference of the source device.

12. The method of claim 10, wherein the playable status is based on information retrieved from the source device, the information being one of user interest to allow decryption for a particular target device, device on/off stage, resource availability for decryption, and network connectivity details.

13. The method of claim 12, further comprising:
monitoring the playable status; and
updating the playable status in real time based on the result of the monitoring.

14. The method of claim 6, further comprising sending information, to the source device, notifying whether the encrypted content has been provided to the target device.

15. An apparatus of a source device in a home network, the apparatus comprising:
a communication interface; and
a processor operatively coupled to the communication interface,
wherein the processor is configured to:
encrypt a content received from a media server,
store the encrypted content and a list of the encrypted content on a shared storage device in the home network;
receive, from the shared storage device, inquiry whether to allow decryption of the encrypted content upon request from at least one device in the home network;
determine whether to allow decryption of the encrypted content based on a content sharing preference regarding the encrypted content; and
respond to the inquiry of the shared storage device depending on the determination,
wherein the content sharing preference is generated by the source device in response to a user input.

16. The apparatus of claim 15, wherein the content sharing preferences comprises at least one of allowing access to the at least one device, and restricting access to the at least one device.

17. The apparatus of claim 16, wherein the processor is further configured to modify the content sharing preferences in real time in response to another user input.

18. The apparatus of claim 15, the processor is further configured to receive information, from the shared storage device, notifying whether the encrypted content has been provided to the at least one device.

19. The apparatus of claim 15, the processor is further configured to send a playable status to the shared storage device,
wherein the playable status includes at least one of a power status of the source device and connection status of the source device to the home network.

20. An apparatus of a shared storage device, the apparatus comprising:
a communication interface; and
a processor operatively coupled to the communication interface,
wherein the processor is configured to:
store an encrypted content provided by a source device in the home network,
provide a content list including the encrypted content to a target device in the home network;
receive a request from the target device to decrypt the encrypted content;
send, to the source device, an inquiry whether to allow decryption of the encrypted content upon receiving the request from the target device;
receive a response to the inquiry determined based on a content sharing preference from the source device; and
selectively decrypt the encrypted content depending on the response from the source device to provide the decrypted content to the target device,
wherein the content sharing preference is generated by the source device in response to a user input.

21. The apparatus of claim 20, wherein the content sharing preference comprises at least one of allowing access to the target device, and restricting access to the target device.

22. The apparatus of claim 20, wherein the processor is further configured to modify the content sharing preference in real time in response to another user input.

23. The apparatus of claim 20, wherein the content sharing preference is stored in at least one of the source device and the shared storage device.

24. The apparatus of claim 20, wherein the content list comprises metadata of the content including at least one of content name, time and date of creation, file format, file size, source device name, network information of the source device, name of user that stored the content in the shared storage device, and a playable status of the stored content.

25. The apparatus of claim 24,
wherein the playable status indicates one of a power status of the source device, a connection status of the source device in the home network, and the sharing preference of the source device, and
wherein the sharing preference indicates whether the target device is allowed to view the content.

26. The apparatus of claim 24, wherein the playable status is based on information retrieved from the source device, the information being one of user interest to allow decryption for a particular target device, device on/off stage, resource availability for decryption, and network connectivity details.

27. The apparatus of claim 26, the processor is further configured to:
monitor the playable status; and
update the playable status in real time based on the result of the monitoring.

28. The apparatus of claim 20, the processor is further configured to send information, to the source device, notifying whether the encrypted content has been provided to the target device.

* * * * *